(12) United States Patent
Blasy et al.

(10) Patent No.: US 6,442,449 B1
(45) Date of Patent: Aug. 27, 2002

(54) SYSTEM AND METHOD FOR PROVIDING DIRECTIONS BETWEEN LOCATIONS

(76) Inventors: Andrew Blasy, 107 Springdale Ave., Huntingdon Valley, PA (US) 19006; Christopher Nagele, 240 Bent Nail Way, Monument, CO (US) 80132

(*) Notice: Subject to any disclaimer, the term of this patent is extended or adjusted under 35 U.S.C. 154(b) by 0 days.

(21) Appl. No.: 09/419,073

(22) Filed: Oct. 15, 1999

(51) Int. Cl.[7] ................................................ G07B 15/02
(52) U.S. Cl. ........................ 700/235; 700/232; 701/118; 340/944; 235/384
(58) Field of Search .................. 705/16, 417; 235/384; 700/231, 232, 233, 235; 701/117, 118, 201; 340/990, 991, 994

(56) References Cited

U.S. PATENT DOCUMENTS 4,951,211 A * 8/1990 De Villeroche ............. 364/444
5,604,676 A * 2/1997 Penzias .................. 364/464.27
6,085,976 A * 7/2000 Sehr ............................ 235/384

* cited by examiner

Primary Examiner—Douglas Hess
(74) Attorney, Agent, or Firm—LaMorte & Associates

(57) ABSTRACT

A computer system that can be embodied in a vending machine or accessed through a personal computer. When embodied as a vending machines, the vending machine has a payment interface for receiving payment of a predetermined fee by a customer. The vending machine also has a display monitor, a printer, a data input device and a telecommunications modem. The computer processor within the vending machine reads a point of destination entered by a customer. The computer processor plots the quickest route from the location of that vending machine to the desired destination. Prior to calculating the quickest route, the computer processor accesses a database of traffic information via a telecommunications link. The route selected between the vending machine and the desired destination takes into account current traffic information.

7 Claims, 3 Drawing Sheets

SYSTEM AND METHOD FOR PROVIDING DIRECTIONS BETWEEN LOCATIONS

BACKGROUND OF THE INVENTION

1. Field of the Invention

In general, the present invention relates to software systems that provide directions and/or a map to a desired destination. More particularly, the present invention relates to such systems, embodied in dedicated machines, that are operated by the public on a pay-for-service basis.

2. Description of the Prior Art

When a person is in an unfamiliar community, that person must rely upon either maps or directions to find his/her way between points. This fact is well known at airports, hotels, visitor centers and the like. Consequently, such locations often provide maps or service representatives to help people with directions. In the past, the service of providing directions has fallen upon rental car clerks, the concierge of the hotel or some gas station attendant on the road. Maps are supplied by hotels and rental car companies and can be bought at service stations.

A problem associated with relying upon a service representative or a gas station is that they are not always conveniently available. Furthermore, a service representative or a gas station attendant may not know directions to where you want to go.

Recognizing the pitfalls of relying upon others for directions, many automated systems have been developed to accommodate people who need directions. The prior art is replete with different types of computer systems that run software for providing maps and/or directions to a specific location. On the Internet, there are numerous web sites where a person can obtain directions to any point in the continental United States. However, such computer systems are rarely available to travelers, as is access to the Internet. Furthermore, the information provided by such systems is rarely updated. Day-to-day changes in traffic patterns, such as road construction, accidents, detours and the like are not taken into account when the directions are given.

A need therefore exists for a system that is conveniently located at places frequented by travelers that can provide a traveler with detailed directions to a desired destination that takes into account daily variations in traffic patterns. This need is met by the present invention as described and claimed below.

SUMMARY OF THE INVENTION

The present invention is a computer system that can be embodied in a vending machine or accessed through a personal computer. When embodied as a vending machines, the vending machine has a payment interface for receiving payment of a predetermined fee by a customer. The vending machine also has a display monitor, a printer, a data input device and a telecommunications modem. The computer processor within the vending machine reads a point of destination entered by a customer. The computer processor plots the quickest route from the location of that vending machine to the desired destination. Prior to calculating the quickest route, the computer processor accesses a database of traffic information via a telecommunications link. The route selected between the vending machine and the desired destination takes into account current traffic information. Accordingly, the quickest route selected may not be the most direct route between points.

When embodied as a personal computer, the hardware of the personal computer substitutes for the structure of the vending machine. When using a personal computer, a customer utilizes the present invention system via the Internet. The system operates in the same manner as does the vending machine except a customer must enter a point of beginning as well as a point of destination.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention system can be adapted for use by home computers, the present invention is particularly well suited for dedicated commercial applications at locations frequented by travelers. Accordingly, by way of example, the present invention system will be described in an application where the system is embodied as a dedicated vending machine located in a location frequented by travels, such as a hotel or airport.

Figure 1:
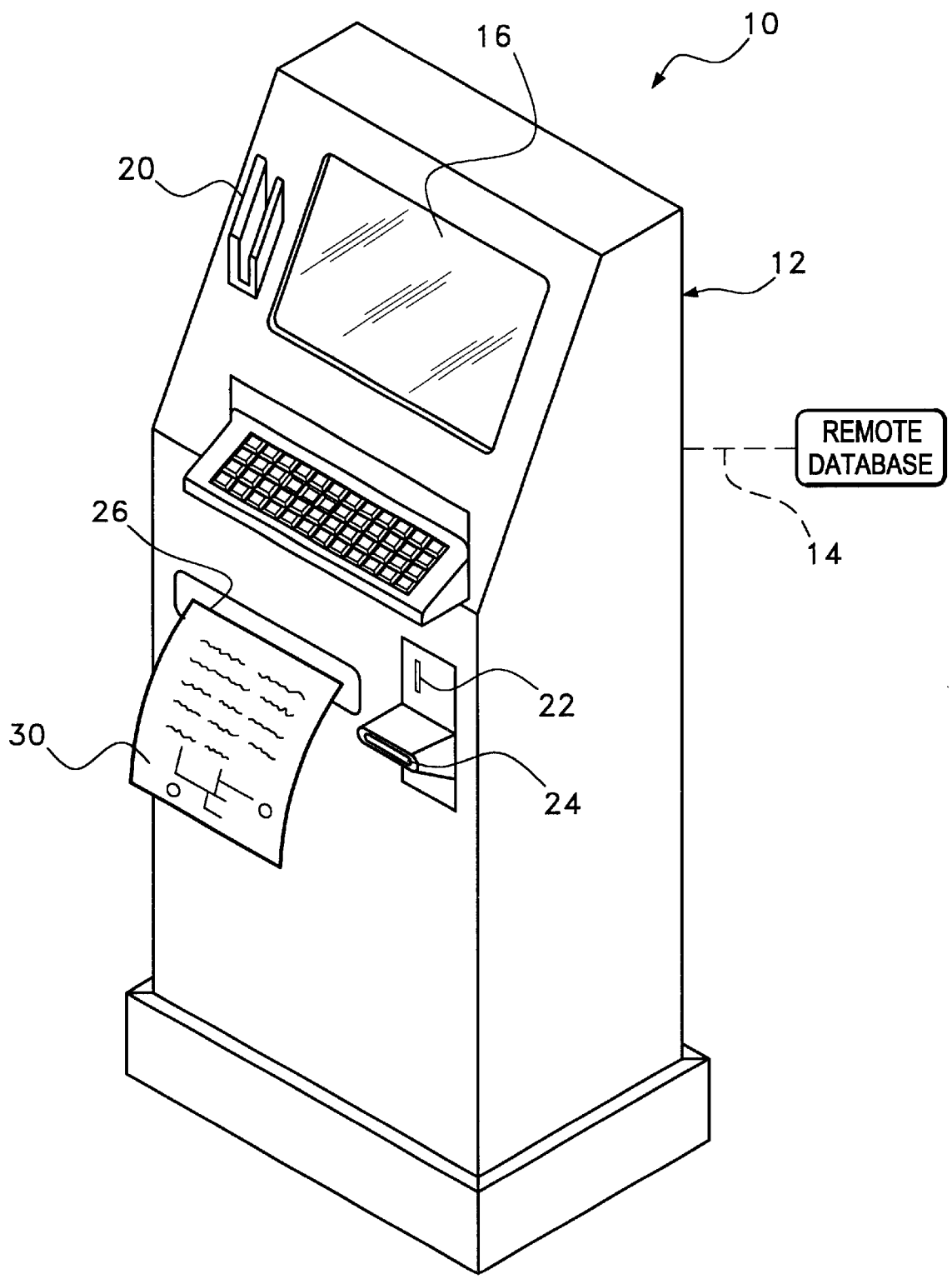
FIG. 1 is front view of an exemplary embodiment of the dedicated vending machine in accordance with the present invention.

Referring to FIG. 1, the present invention system 10 is shown embodied as a vending machine 12. Within the vending machine 12 is contained a computer processor, a printer and a telephone modem. The telephone modem connects to a telephone line 14 for a purpose which will later be explained. The vending machine 12 contains a display monitor 16 and a data input interface 18 which are connected to the internal computer processor. The data input interface 18 can be a keyboard, as is shown. However, the data input interface can also be a mouse, joy stick, touch screen or any other such secondary input device.

The vending machine 12 also contains a means for charging customers. In the shown embodiment, the vending machine 12 contains a credit card slot 20, a coin money slot 22 and a dollar bill unit 24. Any or all of these charging devices can be used to charge customers a predetermined fee for using the vending machine 12.

A map slot 26 is present on the front of the vending machine 12. The map slot 26 is connected to the printer within the vending machine 12 that prints directions and maps, thereby providing the point where a customer can take the directions and map 30 from the vending machine 12.

Figure 2:
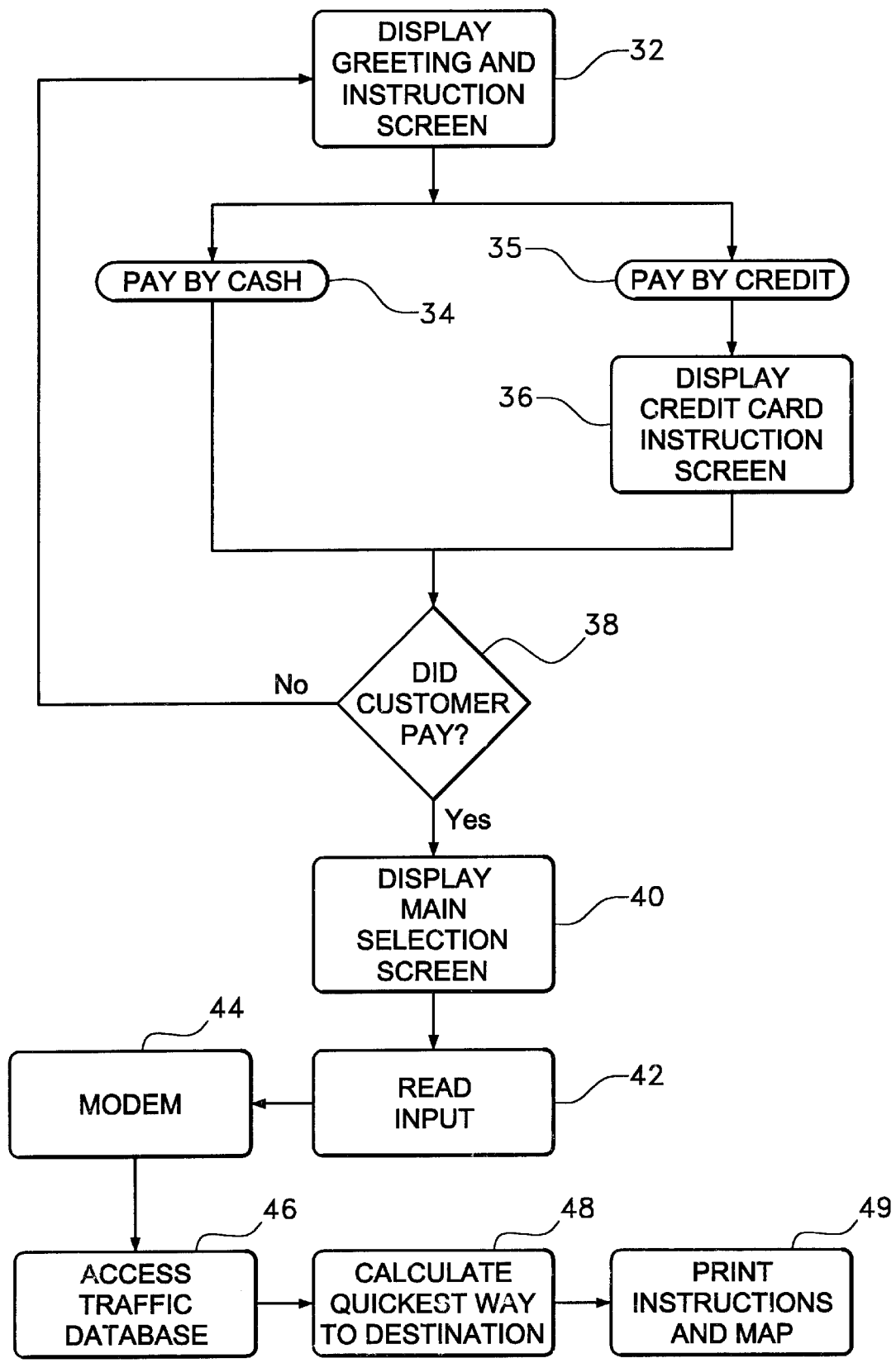
FIG. 2 is a schematic illustrating the logic and method of operation of the present invention system.

Referring to FIG. 2, the method of operation for the vending machine can be explained. From Block 32 in FIG. 2, it can be seen that when a customer approaches the vending machine 12 (FIG. 1) greeting and instruction screens are displayed on the display monitor 16 (FIG. 1) of the vending machine. The greeting and instruction screens will instruct a user on how to use the services provided by the vending machine and will invite the person to use the vending machine. The greeting and instruction screens may consist of several screen images that provide a potential customer with a tutorial of what the vending machine does and how the vending machine works.

Included in the greeting and instruction screens are instructions on how to pay for the services provided by the vending machine. The service can be paid for either in cash or by credit card, as is indicated by Block 34 and Block 35, respectively. If a customer pays by credit card, a credit card instruction screen will appear on the vending machine display to show the customer how to use his/her credit card in the vending machine. This step is illustrated by Block 36 in FIG. 2.

Once payment of use of the vending machine as been verified, as is indicated by Block 38, a main selection screen is displayed. The main selection screen can have many different configurations. The purpose of the main selection screen is to prompt a user to enter the destination to which he/she would like to travel. The showing of the main selection screen is indicated by Block 40 in FIG. 2.

Figure 3:
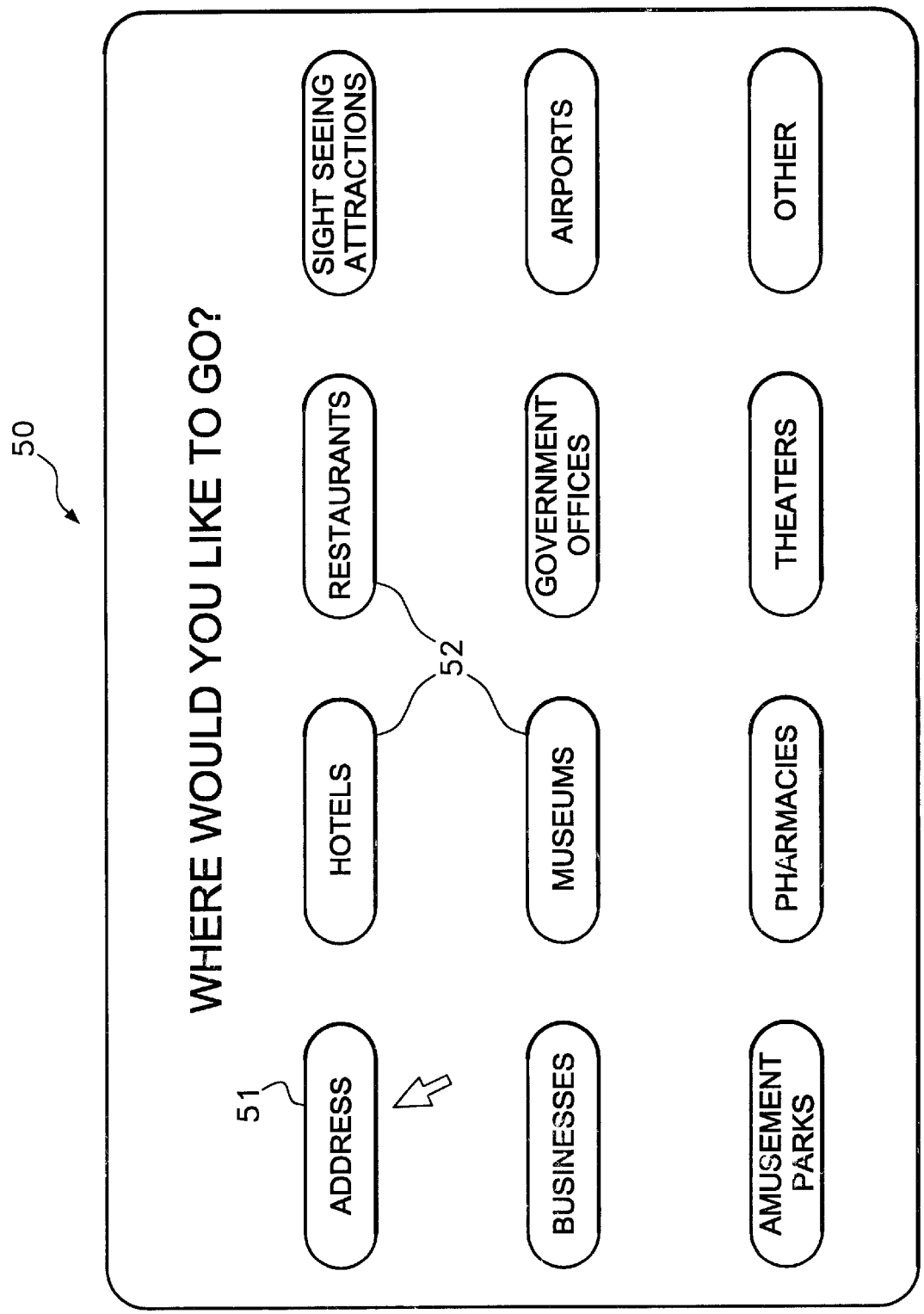
FIG. 3 is an exemplary view of a main selection screen used by the present invention system.

Referring now to FIG. 3, an exemplary embodiment of a main selection screen 50 is shown. On the main selection screen 50 are displayed a variety of category icons 52. The category icons correspond to popular selections of travelers, such as restaurants, museums, airports, hotels, businesses and the like. Using the data input device 18 (FIG. 1) present on the machine, a customer can select one of the category icons 50. Once a category icon 50 is selected, a list of possible choices is displayed. For example, if a person where to select "hotels" a list of hotels could automatically be displayed. A customer then needs only select one of the choices from the list.

In categories such as restaurants, hotels and businesses that have numerous choices, the choices may be displayed in sub-categories for the customer's convenience. For example, restaurants may be categorized by the type of food they serve. Businesses may be categorized by the type of goods or services they provide, such as is used in the Yellow Pages of a telephone book.

Another of the category icons on the main selection screen 50 is the address category icon 51. If a customer selects the address category icon 51, that customer will be prompted to enter a specific address. The address can be the address of any home, business, or any other location. Accordingly, should a person need directions to a specific place that is not in one of the other categories, that customer can be accommodated.

Returning back to FIG. 2, it will be seen that once a person selects a location or enters an address, the computer processor within the vending machine reads the selected/entered data, as indicated by Block 42. Using the data selected/entered by the customer, the computer accesses a database of maps and directions. The database of maps and directions can be contained within the vending machine or can be accessed from a remote location, via the telecommunications modem 44.

Initially, the computer processor calculates the shortest possible route between the location of the vending machine and the destination selected by the customer. However, the computer processor also reads updated traffic information sent to it periodically via the modem 44, as is indicated by Block 46. The updated traffic information contains within it information and locations of road construction, detours, traffic jams, accidents and the like. If the location of a traffic problem corresponds to the route originally plotted by the computer processor, the computer processor plots a new route that circumvents the traffic problem. The plotted course selected will be the quickest course to the destination in view of the traffic information received. This method step is indicated by Block 48.

Many cities and towns gather information on traffic for use in radio and television traffic reports. In some towns, traffic information is gathered by private companies. In other towns traffic information is gathered by the government. In both instances, the gathered traffic information is disseminated to whomever wants it via a computer network. The present invention system will update its traffic database by subscribing to the various traffic data collection agencies around the country. The traffic data will be read to the central database, via a telecommunications link, for use by the various vending machines.

Information concerning traffic flow problems is accessed by the computer processor at least twice a day. Preferably information concerning traffic flow problems will be read to the various vending machines at least once an hour. Since traffic information is sent to the vending machine via a telecommunications link, the computer processor in the vending machine can access traffic information from around the country. A traveler departing for a city by plane can therefore access information about traffic surrounding the airport in that destination city.

As is indicated by Block 49, in FIG. 2, the last step performed by the system is that the directions between the vending machine and the selected destination are printed out. The directions printed out contain a written description of the directions and at least one map that shows the course selected. The written direction and map are provided to the customer through the map slot 26 (FIG. 1).

To summarize the operation of the present system, a person needing directions would approach a vending machine. The customer would then pay for directions using cash or a credit card. Once the fee is paid, the customer selects a destination. The system calculates the quickest way to that destination taking into account all current traffic conditions. Directions to the destination with a map are then printed for the customer to take.

In the embodiment of the present invention system described above, the calculation of determining the quickest route to a destination was performed by a computer within the vending machine. It should be understood that the computer processor need not be located within the vending machine. Rather, the vending machine need only contain a modem and the hardware needed to access a remote computer processor via a telecommunications link.

Many travelers like to know directions to destinations before they even arrive at the town of that destination. For example, a businessman flying into a town for a meeting may want to know directions to that meeting, prior to the landing of his plane. In this manner, the businessman can calculate travel time and work his schedule around that information. In such a scenario, the businessman can obtain such information from a vending machine at the airport in his hometown. However, to be more convenient, the present invention system can be accessed over the Internet.

Using the Internet, a person's home computer can be substituted for the vending machine previously described. Using the Internet, a person can pay a service fee by entering a credit card number. Once the service fee is paid, a person can download directions from any two places desired. The only difference in programming between the Internet system and the dedicated vending machine system is that in using the Internet system, a customer must select a starting point in addition to a destination point. The present invention system will then calculate the quickest route between the points selected using traffic information that is accurate as of the time of the request.

It will be understood that the specifics of the present invention described above illustrate only exemplary embodiments of the present invention. A person skilled in the art can therefore make numerous alterations and modifications to the shown embodiment utilizing functionally equivalent components to those shown and described. All such modifications are intended to be included within the scope of the present invention as defined by the appended claims.

What is claimed is:

1. A vending machine device located at a fixed known location, said device comprising:

a vending machine housing;

a payment interface supported by said vending machine housing for receiving payment of a predetermined fee;

a display monitor contained within said vending machine housing;

a printer contained within said vending machine housing;

a telecommunications modem, contained within said vending machine housing, for receiving traffic information from a remote source;

a data input device for selecting a point of destination, wherein said data input device is supported by said vending machine housing;

a computer processor coupled to said display screen, said printer, said telecommunications modem and said data input device within said vending machine housing, wherein said computer processor plots a route between said known position of said vending machine and said point of destination utilizing said traffic information received through said modem and prints said route on said printer for removal from said vending machine device.

2. The device according to claim 1, wherein said data input device enables a person utilizing said vending machine device to input a specific address of said point of destination.

3. The device according to claim 1, wherein payment interface includes a credit card verification system.

4. The device according to claim 1, wherein said data input device is selected from a group consisting of a keyboard, a touch screen, a joystick and a mouse.

5. A vending machine system for providing directions from any vending machine in the system to any other destination location for a fee, said system, comprising:

a central database containing data regarding traffic conditions on a plurality of different roadways;

a plurality of vending machines coupled to said central database by a telecommunications link, wherein each of said vending machines is at a fixed location known by said central database;

a data input interface located in each said vending machines, wherein said data input interface enables a person at a vending machine to input a destination location;

a computer processor disposed within each of said vending machines for determining the quickest roadway route between said fixed location of the vending machine being used and said destination location utilizing traffic conditions received from said central database.

6. The system according to claim 5, wherein each of said vending machines contains a payment interface for receiving a predetermined fee.

7. The system according to claim 5, wherein each of said vending machines contains a printer for printing a map of said quickest roadway route.

* * * * *